United States Patent
Morishita et al.

(10) Patent No.: US 7,103,727 B2
(45) Date of Patent: Sep. 5, 2006

(54) STORAGE SYSTEM FOR MULTI-SITE REMOTE COPY

(75) Inventors: Noboru Morishita, Yokohama (JP); Toshio Nakano, Chigasaki (JP); Seiichi Higaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 345 days.

(21) Appl. No.: 10/378,644

(22) Filed: Mar. 5, 2003

(65) Prior Publication Data

US 2004/0024975 A1 Feb. 5, 2004

(30) Foreign Application Priority Data

Jul. 30, 2002 (JP) ............................. 2002-220603

(51) Int. Cl.
*G06F 12/00* (2006.01)
(52) U.S. Cl. ..................... 711/147; 711/100; 711/154; 711/161
(58) Field of Classification Search ................ 711/100, 711/147, 151, 154, 161, 162; 714/1, 13, 714/15
See application file for complete search history.

(56) References Cited

U.S. PATENT DOCUMENTS

| | | | | |
|---|---|---|---|---|
| 5,742,792 | A | * | 4/1998 | Yanai et al. ................. 711/162 |
| 6,052,797 | A | | 4/2000 | Ofek et al. |
| 6,052,799 | A | | 4/2000 | Li et al. |
| 6,192,408 | B1 | | 2/2001 | Vahalia et al. |
| 6,209,002 | B1 | * | 3/2001 | Gagne et al. ................ 707/204 |
| 6,324,654 | B1 | | 11/2001 | Wahl et al. |
| 6,397,307 | B1 | | 5/2002 | Ohran |
| 6,408,370 | B1 | | 6/2002 | Yamamoto et al. |
| 6,463,501 | B1 | | 10/2002 | Kern et al. |
| 6,502,205 | B1 | | 12/2002 | Yanai et al. |
| 6,560,719 | B1 | | 5/2003 | Pham et al. |
| 6,581,143 | B1 | | 6/2003 | Gagne et al. |
| 6,671,705 | B1 | | 12/2003 | Duprey et al. |
| 6,691,245 | B1 | * | 2/2004 | DeKoning ..................... 714/6 |
| 2001/0007102 | A1 | | 7/2001 | Gagne et al. |
| 2001/0020282 | A1 | | 9/2001 | Murotani et al. |
| 2002/0059505 | A1 | | 5/2002 | St. Pierre et al. ........... 711/162 |
| 2002/0129202 | A1 | | 9/2002 | Yamamoto et al. |
| 2003/0074599 | A1 | | 4/2003 | Golasky et al. |
| 2003/0115433 | A1 | * | 6/2003 | Kodama ..................... 711/162 |
| 2003/0126387 | A1 | | 7/2003 | Watanabe |
| 2003/0131068 | A1 | | 7/2003 | Hoshino et al. |
| 2003/0145179 | A1 | | 7/2003 | Gabber et al. |
| 2003/0188114 | A1 | | 10/2003 | Lubbers et al. |

(Continued)

FOREIGN PATENT DOCUMENTS

JP 2003122509 4/2003

OTHER PUBLICATIONS

Specification including claims, Abstract and drawings for U.S. Appl. No. 10/096,375, filed Mar. 8, 2002.

*Primary Examiner*—Tuan V. Thai
(74) *Attorney, Agent, or Firm*—Mattingly, Stanger, Malur & Brundidge, P.C.

(57) ABSTRACT

Information about remote copy target volumes of other storage systems 2 each having one and the same original volume V1 is registered for each remote copy target volume in advance. When there occurs a failure in a copy source storage system 2, a copy source volume for remote copy target volumes using the storage system 2 having a failure as their copy source is selected newly from the registered copy source volumes, and remote copy is resumed.

6 Claims, 13 Drawing Sheets

U.S. PATENT DOCUMENTS

2003/0229764 A1   12/2003   Ohno et al.
2004/0078637 A1   4/2004    Fellin et al.
2004/0098547 A1   5/2004    Ofek et al. .................. 711/162
2004/0139128 A1   7/2004    Becker et al. .............. 707/204

* cited by examiner

FIG. 3A

| SEQUENCE NUMBER | TRANSFER-TARGET INFORMATION | FORMALIZA-TION-TARGET INFORMATION |
|---|---|---|
| 1 | 0101··· | 0101··· |
| 3 | 0111··· | 0100··· |
| ⋮ | ⋮ | ⋮ |
| 17 | 1111··· | 1101··· |

FIG. 3B

| SEQUENCE NUMBER COUNTER | 99 |
|---|---|
| TRANSFER-TARGET MANAGEMENT INFORMATION | 0100··· |
| | 1011··· |
| FORMALIZATION-TARGET MANAGEMENT INFORMATION | 0101··· |
| | 1011··· |

FIG. 4A

| REMOTE COPY TARGET FLAG | | | ON(OFF) |
|---|---|---|---|
| SEQUENCE MANAGEMENT INFORMATION NUMBER | | | 1~N |
| NEWEST SEQUENCE NUMBER | | | M |
| DIFFERENCE MANAGEMENT INFORMATION | BIT MAP 1 | | 010010··· |
| | | BIT MAP VALIDITY FLAG | ON(OFF) |
| | | RECORDING START SEQUENCE NUMBER | U |
| | | CUMULATIVE UPDATED DATA AMOUNT COUNTER | V |
| | BIT MAP 2 | | 010010··· |
| | ··· | | ··· |
| | ⋮ | | ⋮ |
| | DIFFERENCE COPY BIT MAP | | 010010··· |
| REGISTERED COPY DESTINATION INFORMATION | | | REGISTERED COPY DESTINATION INFORMATION 1 |
| | | | REGISTERED COPY DESTINATION INFORMATION 2 |
| | | | ⋮ |
| | | | REGISTERED COPY DESTINATION P |
| COPY RESUMPTION INSTRUCTION FLAG | | | ON(OFF) |
| COPY RESUMPTION PRIORITY | | | 1~S |
| NEW COPY SOURCE PRIORITY | REGISTERED COPY SOURCE 1 | | 1~T |
| | REGISTERED COPY SOURCE 2 | | 1~T |
| | ⋮ | | ⋮ |
| | REGISTERED COPY SOURCE Q | | 1~T |
| REGISTERED COPY SOURCE INFORMATION | | | REGISTERED COPY SOURCE INFORMATION 1 |
| | | | REGISTERED COPY SOURCE INFORMATION 2 |
| | | | ⋮ |
| | | | REGISTERED COPY SOURCE INFORMATION Q |
| VALID COPY SOURCE INFORMATION | | | 1~Q |
| TOTAL COPY SOURCE INFORMATION | | | 111010··· |

FIG. 4B

| REGISTERED COPY DESTINATION VALIDITY FLAG | ADDRESS INFORMATION | STORAGE SYSTEM NUMBER | PORT NUMBER | VOLUME NUMBER |
|---|---|---|---|---|
| ON(OFF) | 00011··· | 00101··· | 11101··· | 01001··· |

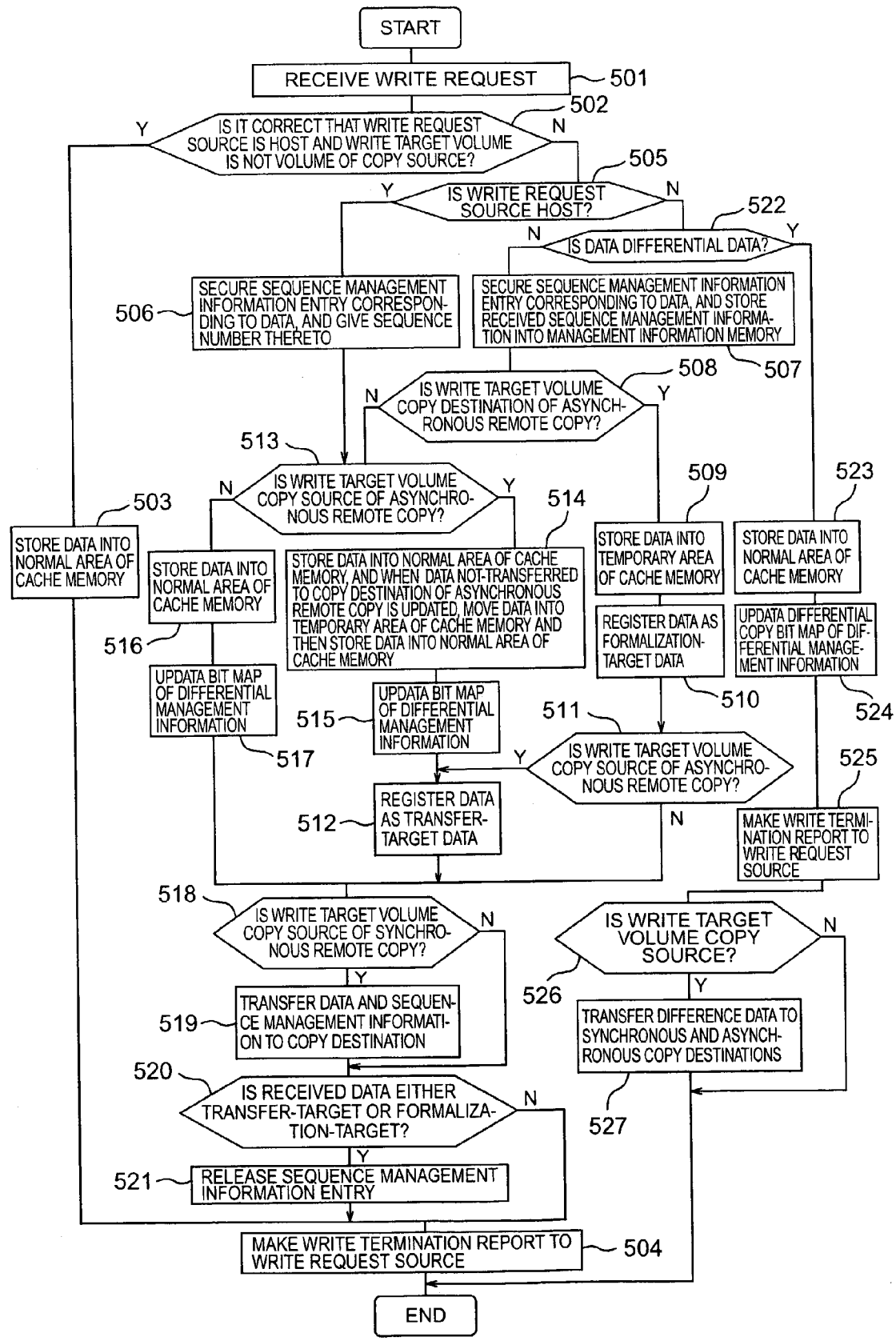

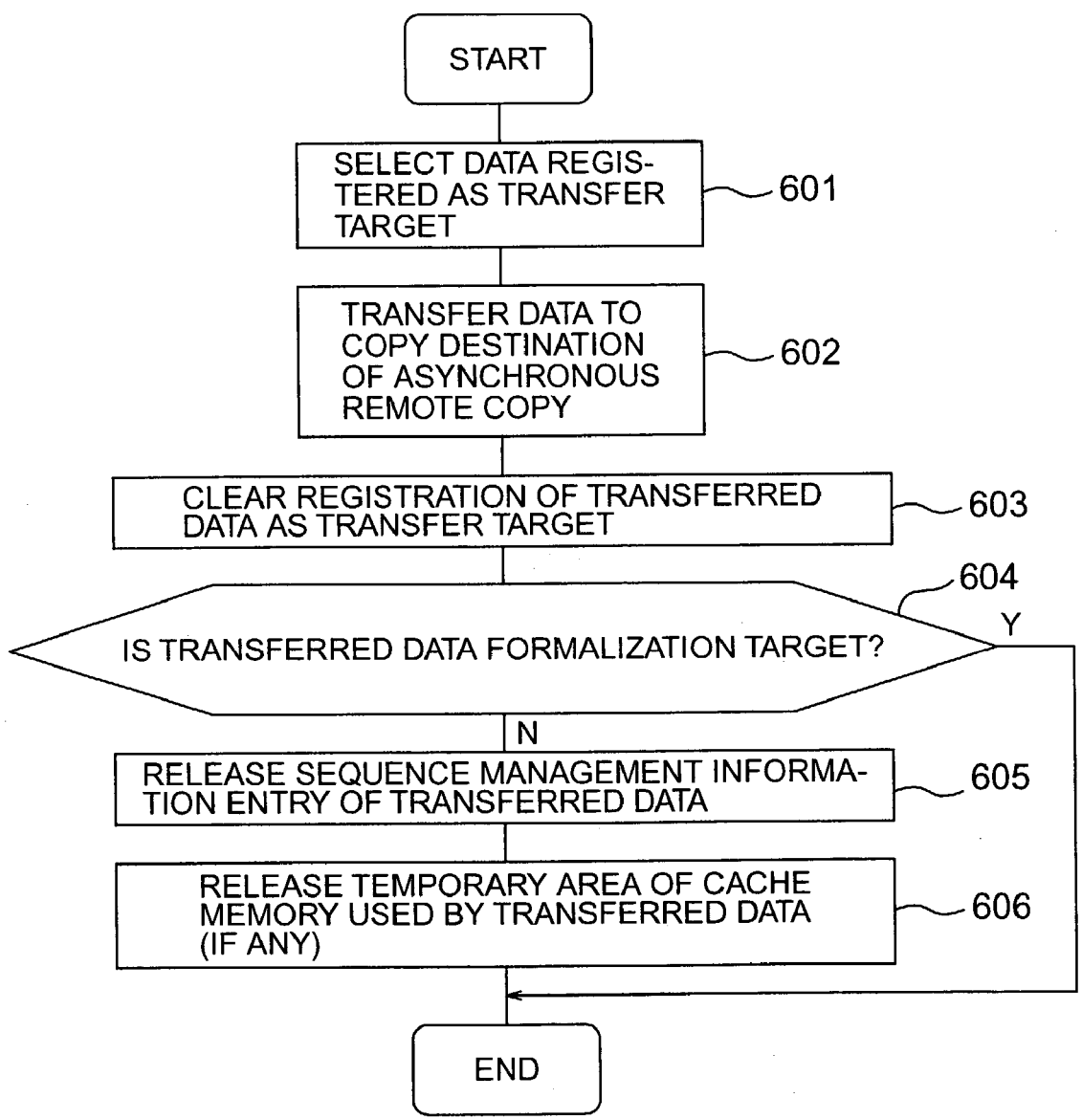

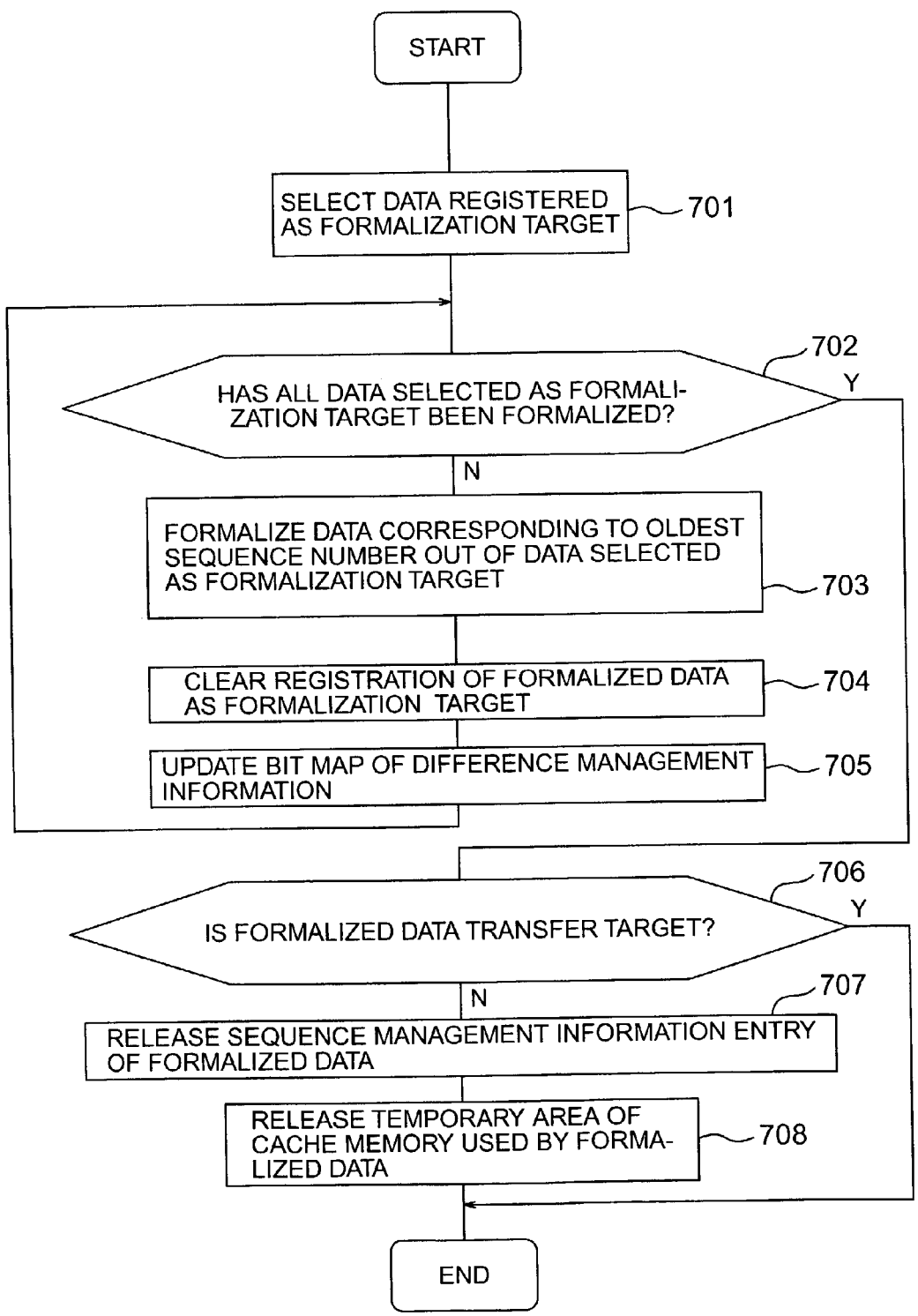

STORAGE SYSTEM FOR MULTI-SITE REMOTE COPY

BACKGROUND OF THE INVENTION

The present invention relates to a technique for duplicating data between storage systems without intervention of any host.

As a technique for avoiding data loss in a storage system due to disaster or the like, there is a remote copy for duplicating data in a storage system at a remote place. Here, assume that the storage system includes a storage control unit and a storage unit. In addition, the remote copy is a technique in which one storage system transfers data in its own storage system to another storage system at a remote place, and storing the data in a storage unit in the remote storage system. As for the remote copy, U.S. Pat. No. 6,408,370 discloses a technique for copying data between different storage control units without intervention of any host computer (hereinafter referred to as "host").

In recent years, there is a demand for performing remote copy among three or more sites. Here the word "site" means a place where a host, a storage system and the like are installed.

As for remote copy among three sites, U.S. Pat. No. 6,209,002 discloses a technique in which data received from a first site is transferred in a lump to a third site by a second site. According to this technique, even if data in the second site is updated by the first site a plurality of times, finally updated data may be sent to the third site in data transmission. It is therefore possible to suppress the increase of the communication cost in transfer paths among the sites.

SUMMARY OF THE INVENTION

In order to manage remote copy among N (N≧3) sites for avoiding data loss, it is desired to adopt a form in which when one of the N sites suffers from a natural disaster or the like, remote copy is re-constructed out of the surviving N−1 sites immediately, and the remote copy is kept up.

However, in the conventional art, change of a copy source in case that one site suffers from disaster is not taken into consideration. For this reason, there is a problem that when remote copy among storage systems using the storage system of the suffered site directly or indirectly as a copy source is shut down, the remote copy cannot be resumed till the suffered site is restored.

To solve this problem, a storage system accepting data transfer performs processing for switching a copy source of data to another storage system when there occurs a failure in a storage system as the copy source for transferring the data to the storage system accepting data transfer. On that occasion, the storage system selects a storage system registered in advance in a management information memory, as a new copy source. Whether transfer of data is kept up or not may be determined in accordance with the priority of the data or the priority of the new copy source.

Incidentally, the copy source is here defined as a storage system transferring data to another storage system in remote copy. When data in a storage system A is transferred to a storage system B, an expression such as "a storage system B using a storage system A as a copy source" or "a volume C belonging to a storage system B using a storage system A as a copy source" is used. In addition, a copy destination is defined as a storage system having a volume in which data transferred from another storage system should be stored in remote copy. Such an expression is used that "a storage system B is set as a copy destination of a storage system A" or "a storage system B is set as a copy destination of a volume C belonging to a storage system A". Further, the word "directly" means that the storage system B receives data from the storage system A without intervention of any other storage system, and the word "indirectly" means that the storage system B receives data from the storage system A through one or more storage systems.

BRIEF DESCRIPTION OF THE DRAWINGS

FIGS. 3A and 3B are diagrams showing an example of the relationship between sequence management information and a cache memory;

FIGS. 4A and 4B are diagrams showing an example of volume management information;

FIG. 5 is a diagram showing an example of write processing executed by a storage system;

FIG. 6 is a diagram showing an example of asynchronous transfer processing executed by a storage system which is an asynchronous copy source;

FIG. 7 is a diagram showing an example of asynchronous formalization processing executed by a storage system which is an asynchronous remote copy destination;

DESCRIPTION OF THE EMBODIMENTS

Figure 1:
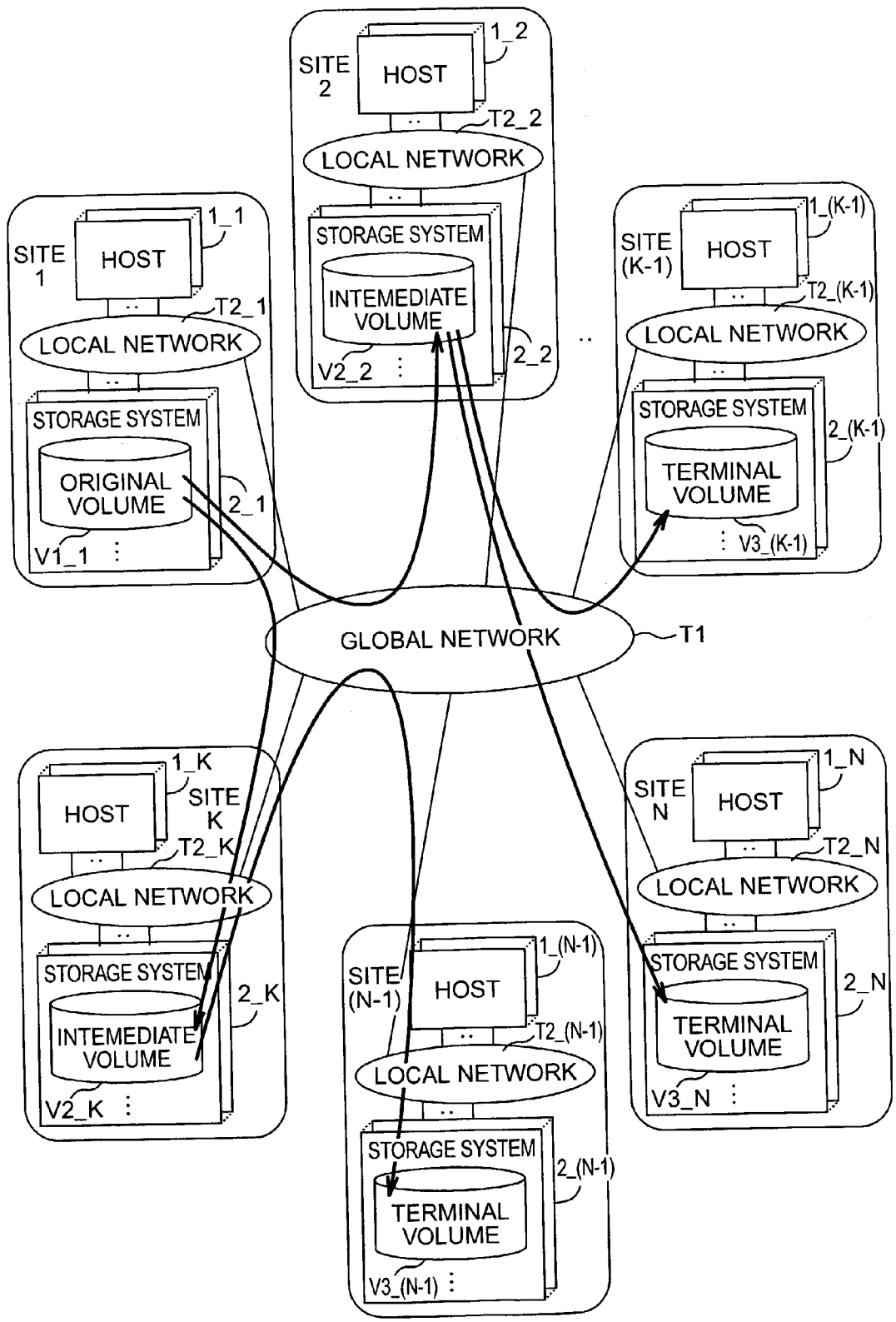
FIG. 1 is a diagram showing an example of the configuration of remote copy among N sites.

FIG. 1 shows a configuration diagram to which the present invention has been applied. In each site, a host 1, a storage system 2, etc. are connected to one another through a local network T2 such as a LAN (Local Area Network) or a SAN (Storage Area Network). On the other hand, of the storage systems 2 in the respective sites, the storage systems 2 executing remote copy are connected with one another through a global network T1. The global network T1 is typically a public communication line, which is often used at a charge by lease from an agency providing communication service. However, the configurations of the local network T2 and the global network T1 are not provided for limiting the present invention. When attention is paid to data of one volume and copy destinations thereof, FIG. 1 shows the state where data is transferred from a site 1 to a site (K−1) and a site N through a site 2, and to a site (N−1) through a site K.

The storage system 2_1 in the site 1 has an original volume V1 storing data written directly from the host 1. Each of the storage systems 2_2 and 2_k in the site 2 and the site K has an intermediate volume V2 for storing data transferred from another storage system 2, and storing data to be further transferred to another storage system. Each of the storage systems 2_(k−1), 2_N and 2_(N−1) in the site (K−1), the site N and the site (N−1) has a terminal volume V3 for storing data transferred from another storage system 2 and not to be transferred to any other storage system 2. Here, the word "volume" means a unit by which a storage medium such as a magnetic disk or the like is handled, and the volume may be a logical unit or a physical unit.

The operation of remote copy is roughly divided into two. One of them is a synchronous remote copy for transferring data to an secondary storage control unit before a termination report of write processing carried out in response to a write request from the host 1 or another storage system 2. The other is an asynchronous remote copy for transferring data to an secondary storage control unit asynchronously with a write request after a termination report of write processing. In the asynchronous remote copy, a volume in an secondary storage control unit has to be updated in accordance with the order in which a volume in a primary storage control unit is updated, in order to secure the update order of a log for an application of a database or the like. To attain this, in the asynchronous remote copy, there is a method in which data received from the principal storage control unit is stored in a volume (or cache memory 5) in the secondary storage control unit in accordance with its sequence number as will be described later. This method is called formalization. Here, the principal storage control unit designates a storage control unit of a copy source to transfer data therefrom, and the secondary storage control unit designates a storage control unit of a copy destination to transfer data thereto from the principal storage control unit.

FIG. 1 includes the relationship "one to many" of the site 2 and the site K with respect to the site 1, and the relationship "multi hop" of the site 1 to the site (K−1) through the site 2. The delay till data reaches the copy destination having a terminal volume from the copy source having an original volume is smaller in "one to many" than in "multi hop". Therefore, the data in each copy destination can be kept closer to the data stored in the copy source in "one to many". However, the number of copy destinations to which the copy source transfers data is so large that the load on the copy source increases.

Figure 2:
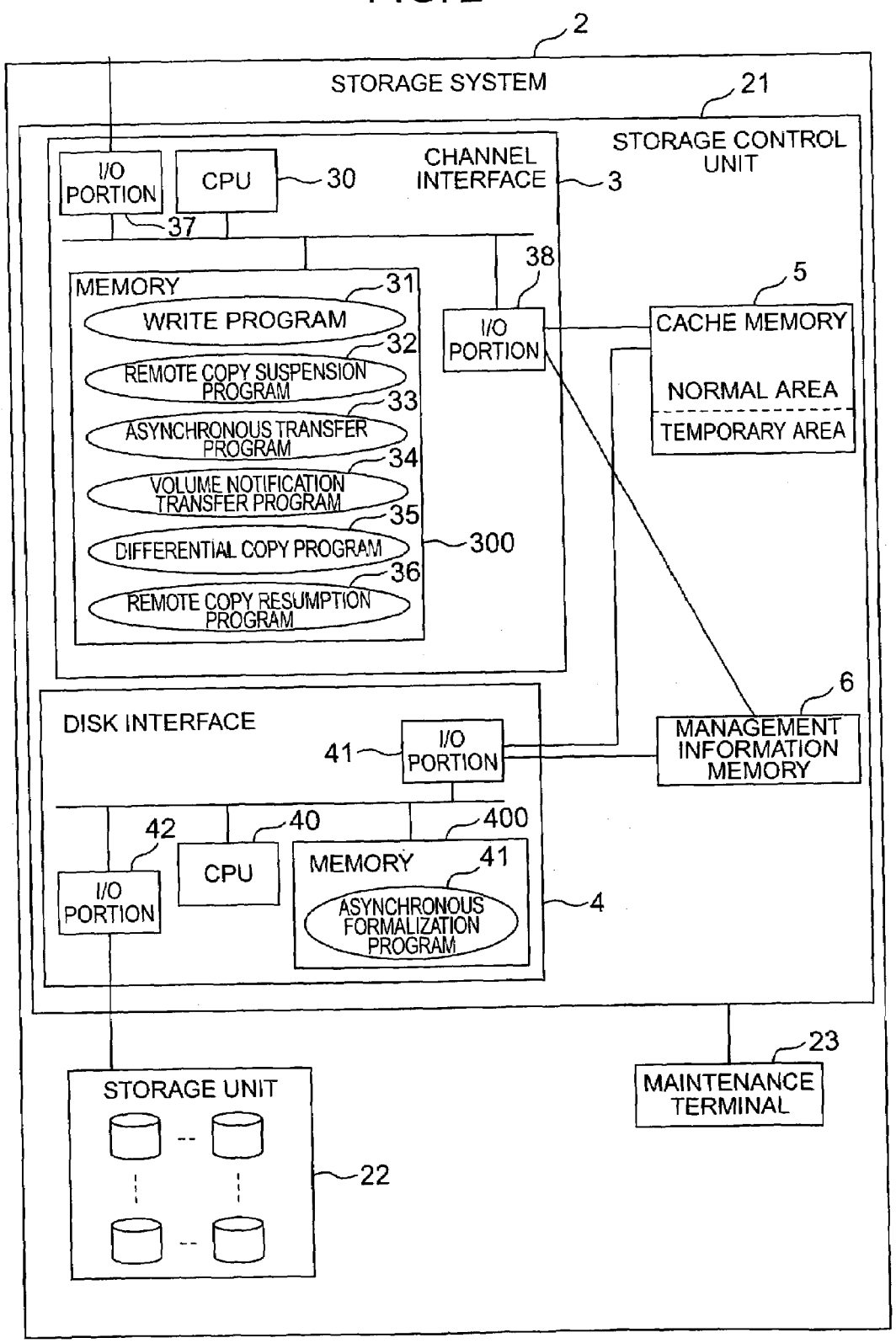
FIG. 2 is a diagram showing an example of the configuration of a storage system.

FIG. 2 shows the configuration of a storage system 2. The storage system 2 includes a storage control unit 21, a storage unit 22, and a maintenance terminal 23 for giving a notification to the storage control unit 21 or displaying the internal state of the storage control unit 21. However, the maintenance terminal 23 is not essential. In FIG. 2, the software is encircled.

The storage control unit 21 includes a channel interface 3, a disk interface 4, a cache memory 5, and a management information memory 6. Incidentally, through not shown, there are a plurality of channel interfaces 3 and a plurality of disk interfaces 4. In addition, the cache memory 5 and the management information memory 6 are duplicated respectively.

Incidentally, according to another embodiment, one CPU for performing overall control over the channel interface 3, the disk interface 4, the cache memory 5, the management information memory 6 and so on may be disposed in the storage control unit 21 in place of CPUs 30 and 40 disposed in the channel interface 3 and the disk interface 4 respectively.

The channel interface 3 and the disk interface 4 are connected to the cache memory 5 and the management information memory 6 through input/output (I/O) portions 38 and 41 by path respectively. The connection by path may be implemented by switch-connection or bus-connection, but the present invention is not limited thereto.

The channel interface 3 is connected to the host 1, a copy source or a copy destination through an I/O portion 37, the local network T2 or the global network T1.

A write program 31, a remote copy suspension program 32, an asynchronous transfer program 33, a volume notification transfer program 34, a differential copy program 35 and a remote copy resumption program 36 are stored in a memory 300 in the channel interface 3.

The CPU 30 in the channel interface 3 executes the write program 31 so as to perform write processing in response to a write request from the host 1 or a write request from a copy source.

The CPU 30 executes the remote copy suspension program 32 and the remote copy resumption program 36 so as to perform processing for switching a copy source to another storage system 2 registered in advance when the copy source has suffered from disaster. The method for registering another storage system 2 as a copy source will be described later.

The CPU 30 executes the asynchronous transfer program 33 so as to perform processing for transferring data to a copy destination asynchronously with a write request when the storage system 2 is a copy source of asynchronous remote copy.

The CPU 30 executes the volume notification transfer program 34 so as to notify a copy source of the contents of processing on a remote copy target volume of the storage system 2. Here, the remote copy target volume means a volume whose data should be copied and saved in another storage system 2. In addition, the processing on the remote copy target volume means processing such as remote copy suspension, remote copy resumption, differential copy termination, and the like, as will be described later. The differential copy means remote copy of differential data as will be described later.

When any site has suffered from disaster and remote copy is resumed among the surviving sites, the CPU 30 executes the differential copy program 35 so as to perform processing for matching the volume contents among the surviving sites.

The disk interface 4 is connected to the storage unit 22 through an I/O portion 42. In addition, an asynchronous formalization program 41 is stored in a memory 400 in the disk interface 4. When the storage system 2 is a copy destination of asynchronous remote copy, the CPU 40 in the disk interface 4 executes the asynchronous formalization program 41 so as to perform processing for formalizing data and storing the formalized data into the storage unit 22.

The cache memory 5 is a nonvolatile memory for storing data. The cache memory 5 stores data to be read and written by the host 1. The configuration of the cache memory 5 can be roughly divided into a normal area and a temporary area. These areas will be described later.

The management information memory 6 is a nonvolatile memory for storing management information of data. The management information memory 6 stores sequence management information and volume management information required for remote copy between storage systems 2. Incidentally, the information stored in the management information memory 6 may be stored in the cache memory 5.

FIGS. 3A and 3B show an example of the details of the sequence management information. Each row in FIG. 3A will be hereinafter referred to as "sequence management information entry". The sequence management information is information to be used in asynchronous remote copy and for formalizing data in the order in which the data has been written from the host 1 (hereinafter, referred to as "write order"). The sequence management information includes a sequence number, transfer-target information, formalization-target information, a sequence number counter, transfer-target management information and formalization-target management information. The sequence number, the transfer-target information and the formalization-target information include a plurality of pieces as information to be stored in sequence management entries.

The sequence number is a number provided for each unit of data supplied from the host 1, and in accordance with the write order.

The transfer-target information is information for managing data to be transferred from the storage system 2 to another storage system 2, through a queue structure by use of a sequence management information entry. Specifically, the transfer-target information is an address indicating the position of another sequence management information entry or an address indicating the position of transfer-target management information as will be described later. These addresses are stored in a corresponding area of the sequence management information entry. Using this information, the storage system 2 can retrieve data or the like to be transferred next to data corresponding to one sequence management information entry.

The formalization-target information is information for managing data to be formalized, through a queue structure by use of a sequence management information entry. Specifically, the formalization-target information is an address of another sequence management information entry or an address of formalization-target management information as will be described later. These addresses are stored in a corresponding area of the sequence management information entry. Using this information, the storage system 2 can retrieve data or the like to be formalized next to data corresponding to one sequence management information entry.

The sequence number counter is information to be used for recording the write order from the host 1.

The transfer-target management information is information by which the order in which data will be transferred to a copy destination is managed in a copy source of asynchronous remote copy. The transfer-target management information is used as a queue header of a queue structure formed out of sequence management information entries, as follows.

First, the CPU 30 secures a sequence management information entry for data written newly. Next, when the write source of the data is the host 1, the sequence number of the written data is acquired from a sequence number counter. On the other hand, when the write source of the data is another storage system 2, the sequence number included in the received data is acquired. Then, the CPU 30 writes the acquired sequence number into the secured sequence management information entry. Incidentally, when the write source of the data is the host 1, the CPU 30 updates the value of the sequence number counter after acquiring the sequence number.

The CPU 30 refers to the queue of sequence management information entries using the transfer-target management information as a queue header, sequentially from the head of the queue, and connects the newly created sequence management information entry to the queue structure so that the sequence numbers are arranged in the ascending order. This reason is that data should be transferred to a copy destination sequentially starting with data corresponding to the sequence management information entry at the head of the queue because data corresponding to a smaller sequence number was written from the host 1 earlier. Here, the upper field of the transfer-target management information in FIG. 3B designates the address of the sequence management information entry at the head of the queue, and the lower field thereof designates the address of the sequence management information entry at the tail of the queue. Accordingly, when a newest sequence number is given to data written newly, the address in which the sequence management information entry corresponding to the data will be stored is registered in the lower field of the transfer-target management information.

The data corresponding to a sequence management information entry connected to a queue using the transfer-target management information as its queue header will be hereinafter referred to as "transfer-target data". In addition, performing the aforementioned operation will be referred to as "registering data as transfer-target data".

The formalization-target management information is information by which the write order of data which has been received from a copy source but has not yet been formalized is managed in a copy destination of asynchronous remote copy. The formalization-target management information is used as a queue header of a queue structure formed out of sequence management information entries.

Operation similar to that for "registering data as transfer-target data" is also performed on data which has not been formalized. This is because data has to be formalized in accordance with its sequence number sequentially starting with data corresponding to a sequence management information entry at the head of the queue in order to secure the write order from the host 1. The data corresponding to a sequence management information entry connected to a queue using the formalization-target management information as its queue header will be hereinafter referred to as "formalization-target data". In addition, performing this operation will be referred to as "registering data as formalization-target data". Here, the field of the transfer-target information does not always match with the field of the formalization-target information because there is data which has been formalized but has not yet been transferred.

Incidentally, the operation for registering data as transfer-target data is not performed on data in a terminal volume. It is because the data does not have to be transferred. In addition, the operation for registering data as formalization-target data is not performed on data in an original volume. It is because the write order of the data is secured due to the data which has been just written from the host 1.

FIGS. 4A and 4B show an example of the details of the volume management information.

The volume management information includes a remote copy target flag, a sequence management information number, a newest sequence number, differential management information, registered copy destination information, a copy resumption instruction flag, copy resumption priority, new copy source priority, registered copy source information, valid copy source information, root copy source information, etc. Further, the registered copy destination information includes information about a plurality of copy destinations corresponding to storage systems 2 which will be copy destinations. The same thing is applied to the registered copy source information.

In addition, the differential management information includes a bit map, a bit map validity flag indicating whether the bit map is in use or not, a recording start sequence number indicating the sequence number with which the recording of the bit map has been started, and a cumulative updated data amount counter indicating the cumulative updated data amount having been counted since the recording of the bit map was started. Incidentally, a plurality of bit maps and a plurality of pieces of management information (such as bit map validity flags, etc.) are prepared in advance for switching a bit map as will be described later. In addition, the differential management information also includes a differential copy bit map to be used for differential information at the time of differential copy. Incidentally, the details of the differential management information will be described later.

Here, the volume management information may be provided for each volume or for each desired storage area. The storage control unit 21 can hold volume management information for each desired storage area unit that can be shared among storage systems 2, and can execute remote copy for each storage area unit.

The remote copy target flag is information indicating that a target volume is either a copy source or a copy destination. Specifically, it is information indicating ON when the target volume is either a copy source or a copy destination.

The sequence management information number is a number specifying the sequence management information corresponding to a volume managed by the volume management information.

The newest sequence number indicates the most advanced sequence number of received data if the volume is a volume of a copy destination of synchronous remote copy and of formalized data if the volume is a volume of a copy destination of asynchronous remote copy.

The differential management information is information for managing information in which updated places in the volume (hereinafter referred to as "differential information") are recorded. The differential management information is used when the volume contents have to be matched with those in other sites due to a site's suffering from disaster or the like.

Here, two methods can be considered as the method for managing the differential information for remote copy among N sites. The first management method is a method making use of differential management in remote copy between two sites. That is, it is a method in which differential management is performed in advance between sites which make no data exchange normally but suppose that data should be matched when a site suffers from disaster. In addition, the second management method is a method which aims at differential management among desired sites. That is, it is a method in which update information from the host 1 starting recording differential information is shared among a volume having the data updated by the host 1 and all copy destinations of the data, and each volume records the updated contents managed by the volume as differential information. Incidentally, data of the portions where the original data differs from the updated data is called differential data.

Specific differential information will be described below by way of example. First, in a storage area managed by volume management information, places updated after one sequence number are recorded as a bit map. Further, before the start of recording as the bit map, communication is made between storage systems 2 having a copy source volume and a copy destination volume for differential management so that the sequence numbers are matched between those volumes in preparation for the start of recording as the bit map. When the contents are matched between the two volumes on the basis of this differential information, first, a volume whose newest sequence number is more advanced when the contents are matched is specified. After that, data stored in updated places indicated by the bit map for differential management corresponding to the volume whose newest sequence number is more advanced is copied to the other volume.

Alternatively, the following method may be used to prevent the differential copy amount from exceeding a fixed value. First, the cumulative updated data amount since the start of recording as a bit map is recorded in the storage system 2. Then, when the cumulative updated data amount exceeds a threshold value, communication is made between storage systems having a copy source volume and a copy destination volume for differential management, so that a new sequence number more advanced than the sequence number at the time of the start of recording of the bit map which is in use currently is shared between the storage systems. Further, in each of the storage systems 2, recording of a bit map different from the bit map in use is started as soon as the newest sequence number in the copy source volume and the copy destination volume reaches the shared sequence number, while recording of the bit map which has been in use till then is suspended. According to this method, the bit map which is in use currently is switched to another new bit map so that the amount of differential data for differential copy can be reduced.

The aforementioned differential information using a bit map can be applied to differential management among two or more desired volumes. That is, it can be used in both the aforementioned first and second management methods of differential information.

Particularly, the aforementioned differential information is used in the second management method of differential information as follows. That is, a storage system 2 having an original volume determines a sequence number where recording of a bit map will be started, and notifies storage systems 2, each having an intermediate volume or a terminal volume, of the sequence number while transferring remote copy data thereto. As a result, the specific sequence number where recording of a bit map will be started can be shared among the storage systems 2 each having an original volume, an intermediate volume or a terminal volume. In addition, when the cumulative updated data amount since the start of recording of the bit map exceeds a threshold value, the storage system 2 having an original volume determines a new sequence number more advanced than the sequence number where recording of updated places into the bit map in use currently was started. After that, the storage system 2 having an original volume notifies the storage systems 2, each having an intermediate volume or a terminal volume, of the determined new sequence number while transferring remote copy data thereto. After that, each of the storage systems 2 each having an original volume, an intermediate volume or a terminal volume starts recording a bit map different from the bit map in use currently as soon as the newest sequence number of the volume reaches the notified new sequence number. After that, the bit map which has been in use till then is suspended. In addition, in the case where it is intended to match the contents among desired ones of original volumes, intermediate volumes and terminal volumes by differential copy in this embodiment, it will go well if the volume whose newest sequence number is the most advanced is specified when the contents are matched, and data recorded in updated places indicated by the bit map of the specified volume is copied from the specified volume to the other volumes.

In the following description of differential management, assume that the aforementioned bit map is used as differential information.

Incidentally, remote copy itself can be also executed between different storage systems 2 in one and the same site. For example, the remote copy can be used for changing the place where data is stored, while accepting a read request or a write request from the host 1.

The registered copy destination information is information about a copy destination registered as a copy destination of a volume corresponding to the volume management information. Specifically, the registered copy destination information includes a registered copy destination validity flag, address information, a storage system serial number, a port number, a volume number, etc. (FIG. 4B). Each row in FIG. 4B is referred to as "registered copy destination information entry". The registered copy destination information includes a number of registered copy destination information entries corresponding to the number of copy destinations registered. The registered copy destination validity flag is information indicating whether the registered copy destination is available as a copy destination or not. The address information is information corresponding to the protocol of the network, showing the address of the copy destination. The storage system serial number is a number for specifying the storage system 2 on the network. The port number is a number for specifying the external connection path of the channel interface 3 in the storage system 2. The volume number is a number of a volume of the registered copy destination to which data of a volume corresponding to the volume management information will be transferred.

The copy resumption instruction flag is information indicating that there is a request to resume remote copy for the volume corresponding to the volume management information after the remote copy is suspended temporarily due to a copy source's suffering from disaster or the like. When there is a request, information indicating ON is set in the entry.

The copy resumption priority is information indicating the remote copy resumption priority of a volume corresponding to the volume management information after remote copy is suspended temporarily due to a copy source's suffering from disaster or the like. Remote copy is resumed in favor of a volume having a larger value of priority.

The new copy source priority is information to be used for determining which copy source should be set as a new copy source when there are a plurality of valid registered copy sources.

The registered copy source information is information about a copy source registered as a copy source of a volume corresponding to the volume management information. The configuration of the registered copy source information is similar to that of the registered copy destination information. For example, the registered copy destination validity flag of the registered copy destination information corresponds to the registered copy source validity flag of the registered copy source information.

The valid copy source information is information indicating which copy source of copy sources registered in the registered copy source information, is a current copy source.

The total copy source information is information specifying an original volume V1 of a volume corresponding to the volume management information. The configuration of the total copy source information is similar to that of the registered copy source information. However, the total copy source information includes only one entry. A storage system 2 having an original volume V1 will be hereinafter referred to as a total copy source.

The registered copy destination information, the copy resumption instruction flag, the copy resumption priority, the registered copy source information and the total copy source information are registered by a user himself or herself or by a maintainance personnel or the like.

Incidentally, a plurality of pieces of sequence management information are established in advance, and a piece of volume management information or a set of pieces of volume management information are associated with each piece of sequence management information. The sequence management information associated with the volume management information is specified by the sequence management information number included in the volume management information. The aforementioned setting or association is performed by a user himself or herself or by a maintainance personnel or the like.

Description will be made on processing when the write program 31 is executed in each storage system 2, with reference to FIG. 5.

The CPU 30 receives a write request (Step 501), and confirms whether there is a case where the write request source is the host 1 and a volume to write data thereinto (hereinafter referred to as write-target volume) is not a volume of a copy source. This is confirmed through the remote copy target flag (Step 502).

When the received write request is a write request to a volume having no relation to remote copy, the CPU 30 stores data into the normal area of the cache memory 5 (Step 503). Then, the CPU 30 makes a report of write termination to the write request source (Step 504). Incidentally, the data written into the normal area of the cache memory 5 is written into the storage unit 22 by the CPU 40 asynchronously with the write request from the host 1.

When there is a case other than the case where the write request source is the host 1 and the write-target volume is not a copy source, the CPU 30 confirms whether the write request source is the host 1 or not (Step 505).

When the write request source is the host 1, the CPU 30 refers to the sequence management information number of the volume management information corresponding to the volume written from the host 1, and newly secures a sequence management information entry in the corresponding sequence management information. Then, the sequence number of the received data is acquired from the sequence number counter, and the sequence number is written (given) into the sequence management information entry secured newly. After that, the value of the sequence number counter is updated.

To give the sequence number is carried out regardless of whether the remote copy is synchronous or asynchronous. The reason is as follows. That is, even if the direct copy destinations of the volume are only the copy destinations of synchronous remote copy, there is a case where these copy destinations and the following destinations may execute asynchronous remote copy (Step 506).

When it is concluded in Step 505 that the write request source is not the host 1, the CPU 30 confirms whether data related to the write request is differential data or not (Step 522).

In the case of differential data, the CPU 30 executes the processing on and after Step 523. The processing on and after Step 523 will be described later. When the data is not differential data, the CPU 30 secures a sequence management information entry corresponding to the received data, and stores the sequence management information including the sequence number received together with the data into the management information memory 6 (Step 507).

After that, the CPU 30 judges whether the write-target volume is a copy destination of asynchronous remote copy or not (Step 508).

Here, description will be made on the method for storing data into the cache memory 5. When the write-target volume is a volume of a copy destination of asynchronous remote copy, the CPU 30 once saves the received data into the temporary area of the cache memory 5, and formalizes the data in accordance with its sequence number. In this embodiment, the formalized data is moved from the temporary area of the cache memory 5 to the normal area thereof. When the write-target volume is a volume of a copy source of asynchronous remote copy, in the case where the CPU 30 receives data for updating data which has not yet been transferred to the copy destination of asynchronous remote copy, the CPU 30 saves the data, which has not been updated and which has not been transferred, into the temporary area of the cache memory 5, and then stores the received data into the normal area of the cache memory 5. On the other hand, when the write-target volume is a volume which is a copy destination and a copy source of asynchronous remote copy, the same processing as in the case where the volume is a volume of a copy destination is executed. Incidentally, processing in the case of differential data is shown as different steps in FIG. 5, for the sake of simplification of description.

When the write-target volume is a copy destination of asynchronous remote copy, the CPU 30 has to write data in accordance with the sequence number indicating the update order from the host 1, as described above. Therefore, the CPU 30 once stores the data into the temporary area of the cache memory 5 (Step 509). Then, the CPU 30 registers the stored data as formalization-target data (Step 510). Further, the CPU 30 judges whether the write-target volume is a copy source of asynchronous remote copy or not (Step 511). When it is a copy source, the CPU 30 registers the data stored in the temporary area as transfer-target data (Step 512).

When the write-target volume is not a copy destination of asynchronous remote copy, the CPU 30 judges whether the write-target volume is a copy source of asynchronous remote copy or not (Step 513). When it is a copy source, the CPU 30 stores the data into the normal area of the cache memory 5. However, when the CPU 30 receives data for updating data which has not yet been transferred to a copy destination of asynchronous remote copy, the CPU 30 moves the data, which has not been transferred, to the temporary area of the cache memory 5, and then stores the updating data into the normal area (Step 514). Further, the CPU 30 updates the differential management information. Specifically, a bit at a place corresponding to the data to be updated is set in a valid bit map of the differential management information. Further, the updated data amount is added to the cumulative updated data amount counter (Step 515).

When it is concluded in Step 513 that the write-target volume is not either a copy destination or a copy source of asynchronous remote copy, the CPU 30 stores the data into the normal area of the cache memory 5 (Step 516). Further, the CPU 30 updates the differential management information (specifically, in the same manner as in Step 515, sets a bit at a place corresponding to data to be updated in a bit map for the differential management information, and further adds the updated data amount to the cumulative updated data amount counter) (Step 517), and executes the processing on and after Step 518.

On the other hand, it is concluded in Step 522 that the data is differential data, the CPU 30 stores the data into the normal area of the cache memory 5 (Step 523). After that, the CPU 30 updates the differential management information. Specifically, in order to record the progress of differential copy, a bit at a place corresponding to differential data is cleared in a differential copy bit map in which the differential information received before the start of the differential copy is stored (Step 524).

After Steps 511, 512 and 517, the CPU 30 judges whether the write-target volume is a copy source of synchronous remote copy or not (Step 518). When it is a copy source, the CPU 30 transfers the data and the contents of the sequence management information entry corresponding to the data to copy destinations of the synchronous remote copy. Incidentally, in order to shorten the time from reception of the write request to a report of write termination made to the write request source, the synchronous remote copy may be executed in parallel for a plurality of copy destinations, for example, by means of multicasting. (Step 519).

After data and so on are transferred, or when the write-target volume is not a copy source, the CPU 30 judges whether the received data has been registered as either transfer-target data or formalization-target data or not (Step 520). When the data is not registered as either, the CPU 30 releases the sequence management information entry secured beforehand (Step 521) because the sequence management information entry corresponding to the data is not required.

Finally, the CPU 30 makes a report of write termination to the write request source (Step 504), and terminates the processing.

On the other hand, the CPU 30 having updated the differential management information in Step 524 notifies the write request source of write termination (Step 525).

Next, the CPU 30 judges whether the write-target volume is a copy source or not (Step 526). When it is a copy source, the CPU 30 transfers differential data to copy destinations of synchronous and asynchronous remote copy (Step 527). After the differential data is transferred, or when the write-target volume is not a copy source, the CPU 30 terminates the processing. The differential copy may be carried out in parallel for a plurality of copy destinations, for example, by means of multicasting.

Description will be made on processing in the case where the asynchronous transfer program 33 is executed in a copy source of asynchronous remote copy, with reference to FIG. 6. This program may be executed for each sequence management information unit. Alternatively, the program may be executed in a fixed period or in accordance with a fixed target data amount. By this processing, the contents of data updated in a copy source of asynchronous remote copy is transferred from the copy source to copy destinations at any time asynchronously with a write request to the copy source.

First, the CPU 30 selects data registered as transfer-target data (Step 601).

Next, the CPU 30 transfers the selected data to the copy destinations of asynchronous remote copy (Step 602). In order to shorten the data transfer time to a plurality of copy destinations, the data may be transferred in parallel to a plurality of copy destination, for example, by means of multicasting.

Next, the CPU 30 clears the registration of the transferred data as transfer-target data (Step 603).

Next, the CPU 30 judges whether the transferred data has been also registered as formalization-target data (Step 604). When the data has not been registered, the CPU 30 releases the sequence management information entry corresponding to the data (Step 605) because it becomes unnecessary to manage the transferred data. Then, the CPU 30 also releases the temporary area of the cache memory 5 (Step 606) in the case where the transferred data has used the temporary area. On the other hand, when the transferred data has been registered as formalization-target data, the CPU 30 terminates the processing as it is.

Description will be made on processing in the case where the asynchronous formalization program 41 is executed in a copy destination of asynchronous remote copy, with reference to FIG. 7. This processing may be executed for each sequence management information unit. Alternatively, the processing may be executed in a fixed period or in accordance with a fixed target data amount. By this processing, data is formalized, and stored in the normal area of the cache memory 5. Incidentally, in this embodiment, there is no particular description on the processing for transferring the data stored in the cache memory 5 to the storage unit 22, but this processing is carried out by the CPU 40 based on a known technique.

First, the CPU 40 selects data registered as formalization-target data (Step 701). In the selection method, data ranging from data corresponding to the smallest number to data corresponding to the number one smaller than the most advanced number of the consecutive numbers is selected from a plurality of pieces of data having consecutive sequence numbers.

Next, the CPU 40 judges whether all the selected formalization-target data has been formalized or not (Step 702). When the data has not been formalized, the CPU 40 formalizes data corresponding to the oldest sequence number out of the selected data as formalization target (Step 703).

Next, the CPU 40 clears the registration of the formalized data as formalization-target data (Step 704).

Next, the CPU 40 updates the differential management information. Specifically, in the same manner as in Step 515, a bit at a place corresponding to the formalized data is established in a valid bit map of the differential management information. Further, the updated data amount is added to the cumulative updated data amount counter (Step 705). After that, the routine of processing returns to the processing of Step 702.

When it is concluded in Step 702 that the data has been formalized, the CPU 40 judges whether the formalized data has been also registered as transfer-target data or not (Step 706).

When the data has not been registered, the CPU 40 clears the sequence management information entry corresponding to the data (Step 707) because it becomes unnecessary to manage the data. Then, the CPU 40 releases the temporary area of the cache memory 5 used by the data (Step 708). On the other hand, when the formalized data is transfer-target data, the CPU 40 terminates the processing as it is.

Figure 8:
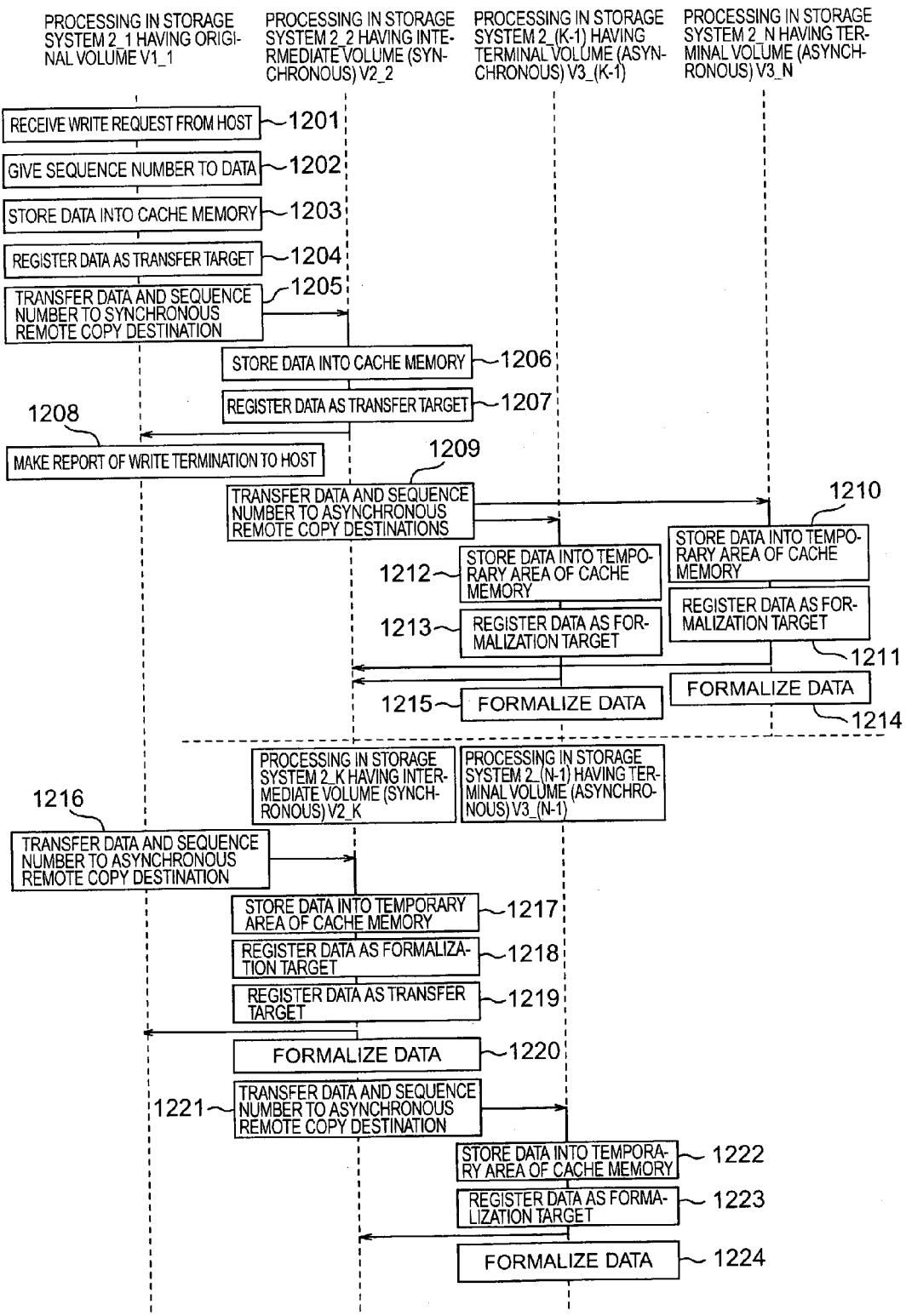
FIG. 8 is a diagram showing an example of the outline of processing in respective storage systems for remote copy among N sites.

FIG. 8 shows the processing procedure in each system when data is transferred to intermediate volumes V2_2 (regarded as a copy destination of synchronous remote copy) and V2_K (regarded as a copy destination of asynchronous remote copy), and terminal volumes V3_(K-1), V3_(N-1) and V3_N (each regarded as a copy destination of asynchronous remote copy) in the case where the data has been written from the host 1 into an original volume V1_1, as shown in FIG. 1.

The storage system 2_1 having the original volume V1_1 receives a write request from the host 1 (Step 1201), gives a sequence number to data accompanying the write request (Step 1202), and stores the data given the sequence number into the cache memory 5 (Step 1203). Further, the data stored in the cache memory 5 is registered as transfer-target data for the intermediate volume V2_K which is a copy destination of asynchronous remote copy (Step 1204). After that, the data and the sequence number stored in the cache memory are transferred to the storage system 2_2 having the intermediate volume 2_2 which is a copy destination of synchronous remote copy (Step 1205).

The storage system 2_2 stores the received data into the cache memory 5 (Step 1206), and stores the sequence number received together into the management information memory 6. Further, the storage system 2_2 registers the received data as transfer-target data for the terminal volumes V3_(K-1) and V3_N which are copy destinations of asynchronous remote copy (Step 1207). In response to a reply of data reception from the storage system 2_2, the storage system 2_1 makes a report of write termination to the host 1 (Step 1208). Then, the write request from the host 1 is terminated.

In the storage system 2_2, the data registered in Step 1207 is selected as transfer target, and the data and the sequence number are transferred to the terminal volumes V3_(K-1) and V3_N at predetermined timing (Step 1209).

Each of the storage systems 2_(K-1) and 2_N having the terminal volumes V3_(K-1) and V3_N stores the received data into the temporary area of the cache memory 5 (Step 1210, 1212), and further registers the received data as formalization-target data (Step 1211, 1213). After that, in each of these storage systems 2, the registered data is selected as formalization-target data, and formalized (Step 1214, 1215).

On the other hand, the storage system 2_1 selects the data registered in Step 1204, as transfer target, and transfers the data and its sequence number to the intermediate volume V2_K which is a copy destination of asynchronous remote copy (Step 1216).

The storage system 2_K stores the received data into the temporary area of the cache memory 5 (Step 1217), registers the received data as formalization-target data (Step 1218), and registers the received data as transfer-target data for the terminal volume V3_(N-1) which is a copy destination of asynchronous remote copy (Step 1219). After that, in the storage system 2_K, the registered data is selected as formalization-target data, and formalized (Step 1220).

The processing from Step 1221 to Step 1224 executed by the storage system 2_K storing the intermediate volume V2_K and the storage system 2_(N-1) storing the terminal volume V3_(N-1) is similar to the processing from Step 1209 to Step 1215.

Figure 9:
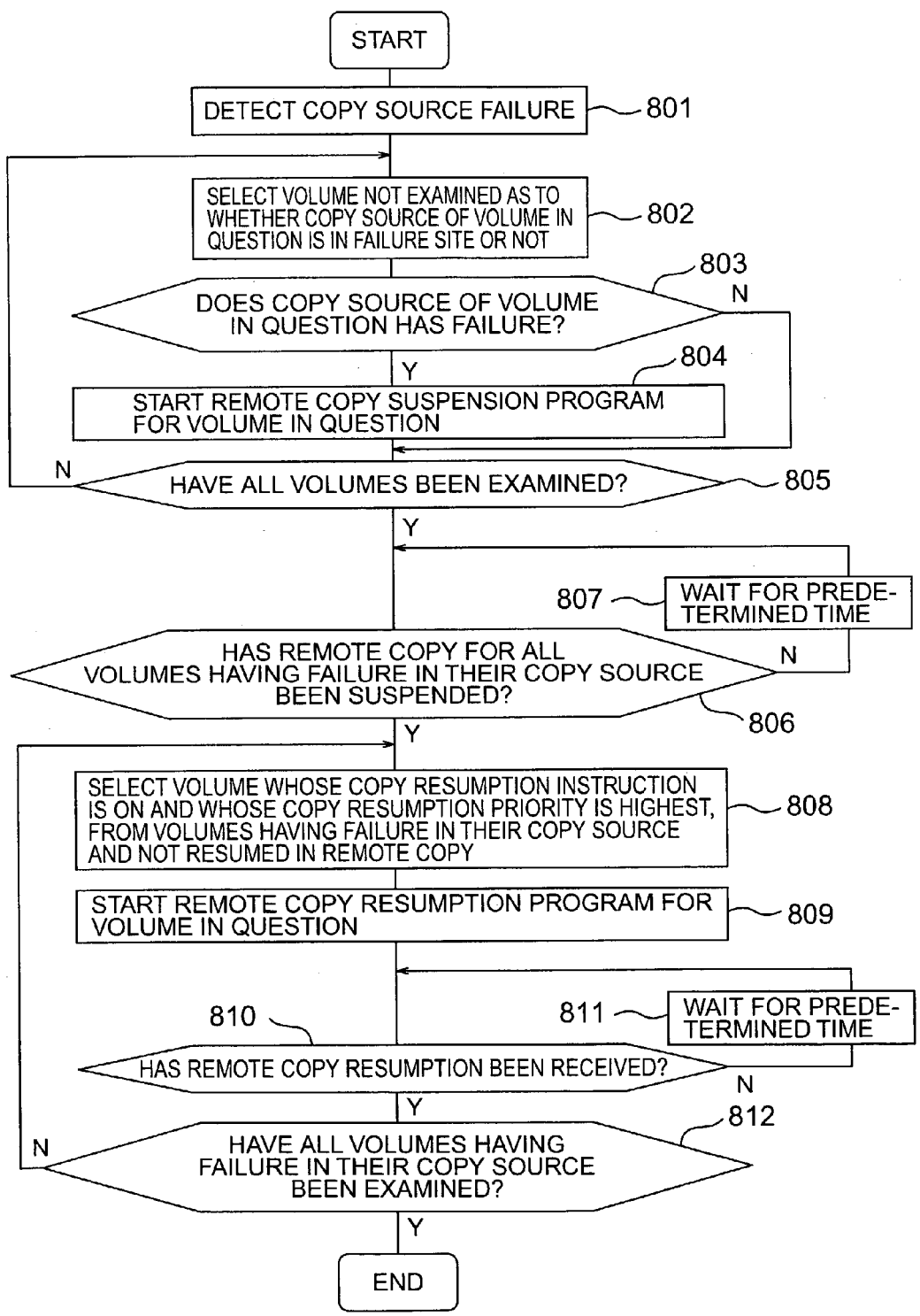
FIG. 9 is a diagram showing an example of failure processing executed by a storage system having detected a failure in a copy source.

FIG. 9 is a flow chart for explaining the processing when a failure of a copy source has been detected by the CPU 30 in a storage system 2 having an intermediate volume V2 or a terminal volume V3.

First, the CPU 30 detects a failure of a copy source. For example, the storage system 2 concludes a failure of a copy source when time out or error retry out occurs in data transfer, confirmation of a transfer path executed in a fixed frequency between a copy source and a copy destination, or the like (Step 801).

Next, the CPU 30 selects a volume which has not yet been examined as to whether there occurs a failure in a copy source therefor, on the basis of information in the management information memory 6 (Step 802).

Next, the CPU 30 examines whether there occurs a failure in a copy source corresponding to the selected volume. Specifically, it is judged on the basis of whether the copy source registered as valid copy source information is identical to the copy source having a failure or not (Step 803). When the copy source corresponding to the selected volume has a failure, the CPU 30 starts the remote copy suspension program 32 for the selected volume. When the remote copy suspension program is started, remote copy suspension processing is performed. The processing will be described later (Step 804).

Next, the CPU 30 examines whether the processing from Step 802 to Step 804 has been executed on all the remote copy target volumes or not (Step 805). When it has been executed, the processing of Step 806 is executed. When it has not been executed, the routine of processing returns to Step 802, executing the processing therefrom.

Next, the CPU 30 judges whether remote copy for all the volumes having a failure in their copy source has been suspended (Step 806). When it has not been suspended, the CPU 30 waits for a predetermined time (Step 807), and executes the processing of Step 806 again.

When the remote copy has been suspended, the CPU 30 checks the volume management information so as to select a volume as a volume for which the remote copy should be resumed. As the volume, a volume whose remote copy has not yet been resumed, whose copy resumption instruction flag is ON, and whose copy resumption priority is the highest, is selected from a set of volumes having a failure in their copy source. This is because the remote copy for data having higher priority is resumed more earlier and more surely.

Incidentally, for volumes having low priority, their copy resumption instruction flags may be set to be OFF in advance. In this case, remote copy for the volumes is suspended as soon as there occurs a failure. In addition, for volumes having middle priority, their copy resumption instruction flags may be set to be ON, and their copy resumption priorities may be set to be low. Thus, such a case is avoided that remote copy for such a volume is resumed to increase the load on the storage system 2 so that remote copy for a volume having higher priority cannot be resumed. Further, an intermediate volume or a terminal volume in a site closer to an original volume may be set to have a higher value of copy resumption priority so that required minimum multiplicity for remote copy can be secured (Step 808).

Next, the CPU 30 starts the remote copy resumption program for the selected volume. The remote copy resumption program will be described later (Step 809).

Next, the CPU 30 judges whether a remote copy resumption notification has been received from a new copy source. Specifically, the CPU 30 judges whether a remote copy resumption notification in Step 1103 in FIG. 12 in the differential copy program executed by a storage system 2 of a new copy source as will be described later has been detected or not. Here, the reason why the CPU 30 does not wait till the differential copy processing with the new copy source is terminated is as follows. That is, there is a possibility that it takes long time till the differential copy processing of a volume performed by the start of the copy resumption program is terminated. Therefore, it will takes much time to resume remote copy if the CPU 30 waits till the differential copy processing is terminated. In addition, once remote copy is resumed, there is no fear that the remote copy which has already been resumed is interrupted again by the influence of remote copy resumed newly. Therefore, only after remote copy for one volume has been resumed, remote copy can be resumed with intended priority even if remote copy resumption processing for a new volume is kept up. Alternatively, as a simpler method, based on the fact that the remote copy has been resumed by the start of the remote copy resumption program in Step 809, it may be concluded that a remote copy resumption notification has been received from the copy source (Step 810). When a remote copy resumption notification has not been received, the CPU 30 waits for a predetermined time (Step 811), and executes the processing of Step 810 again.

Next, the CPU 30 examines whether the processing from Step 808 to Step 811 has been executed on all the volumes having a failure in their copy source or not (Step 812). When the processing has been executed, the routine of processing is terminated. When the processing has not been executed, the processing on and after Step 808 is executed again.

Incidentally, not when a failure in a copy source has been detected but when an overload notification indicating the difficulty of keeping up remote copy processing due to increase in load on the copy source or the like has been received from the copy source, the copy source may be changed in response thereto. A specific example of the load on a copy source includes, for example, the case where the rate of utilization of the temporary area of the cache memory 5 exceeds a predetermined threshold value in asynchronous remote copy.

Alternatively, the copy source may be changed in response to an instruction from the maintenance terminal 23 by a user himself or herself or by a maintainance personnel or the like. Here, all the storage systems 2 can identify a current copy source, a total copy source and a current copy destination for each remote copy target volume on the basis of the information shown in FIGS. 4A and 4B. Accordingly, only if the user himself or herself, the maintainance personnel or the like issues an instruction to a desired storage system 2 having one of an original volume, an intermediate volume and a terminal volume through the maintenance terminal, the host 1 or the like, an instruction to change the copy source for an original volume, and all the intermediate volumes and terminal volumes which will be remote copy destinations of the original volume can be issued.

Further, a management site having a management terminal may be provided newly so that information such as total copy source information belonging to all the storage systems 2 each having an original volume is registered in the management terminal. In this case, using the management terminal, the user can issue an instruction to change copy sources for all the original volumes belonging to the storage systems 2 connected to the network, and all the intermediate volumes and the terminal volumes in copy destinations of all the original volumes. Incidentally, an existing site may be used as the management site, that is, one host 1 may be used as the management terminal.

In addition, when storage systems 2 of other sites gain access to the management terminal, for example, after a copy source of another copy source can detect a failure in the latter copy source, and gives a notification of the failure to copy destinations through the management terminal. The copy destinations may change their copy source in response to this notification.

Figure 10:
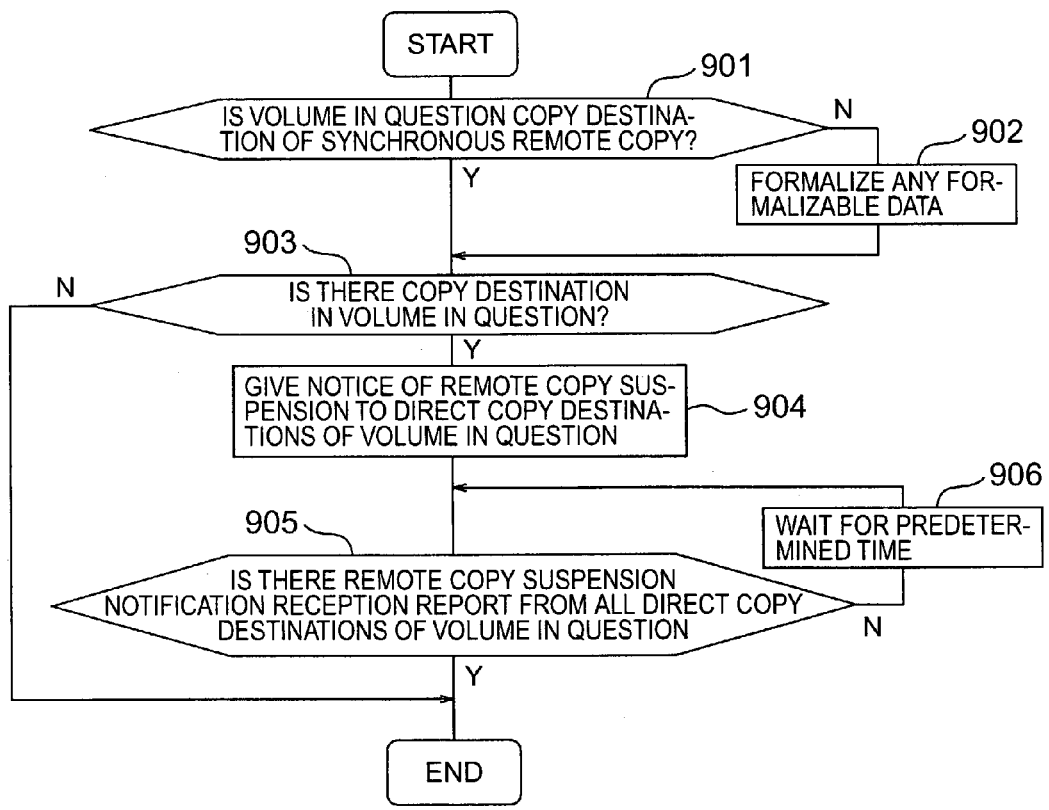
FIG. 10 is a diagram showing an example of remote copy suspension processing executed by a storage system having detected a failure in a copy source.

FIG. 10 is a flow chart for explaining the processing procedure of the remote copy suspension program 32 started in Step 804 in FIG. 9.

First, the CPU 30 examines whether a volume instructed to suspend remote copy is a copy destination of synchronous remote copy or a copy destination of asynchronous remote coy (Step 901). In the case of asynchronous remote copy, the CPU 30 formalizes any data that can be formalized (Ste 902).

In the case of synchronous remote copy, or after finishing formalizing data in the case of asynchronous remote copy, the CPU 30 judges whether there are copy destinations in the volume which will be a target of remote copy suspension or not (Step 903).

When there are copy destinations in the volume (corresponding to an intermediate volume V2), the CPU 30 gives a notification of remote copy suspension to all the direct copy destinations of the volume (Step 904). When there is no copy destination in the volume (corresponding to a terminal volume V3), the CPU 30 terminates the processing.

Next, the CPU 30 judges whether a reception report of the remote copy suspension notification has been received from each of the direct copy destinations of the volume (Step 905).

When there is no report, the CPU 30 waits for a predetermined time (Step 906), and executes the processing of Step 905 again. When there is a report, the CPU 30 terminates the remote copy suspension processing.

On the other hand, a storage system 2 receiving the aforementioned remote copy suspension notification or the like issued in Step 904 executes the volume notification transfer program 34, so as to execute processing similar to that from Step 901 to Step 906. In this case, the storage system 2 receiving the remote copy suspension notification suspends remote copy in the newest sequence number the same as that in the volumes taking part in the remote copy suspension notification.

Then, when a remote copy suspension notification reception report has been received from each of the direct copy destinations of the volume, the storage system 2 transmits the remote copy suspension notification reception report to the reception source of the remote copy suspension notification.

Incidentally, the CPU 30 executes the volume notification transfer program 34 so as to transfer a remote copy resumption notification, a differential copy notification and so on as well as the remote copy suspension notification to other storage systems 2. However, differently from the processing for the remote copy suspension notification, Step 901 and Step 902 are not executed for the remote copy resumption notification, the differential copy notification and so on.

Figure 11:
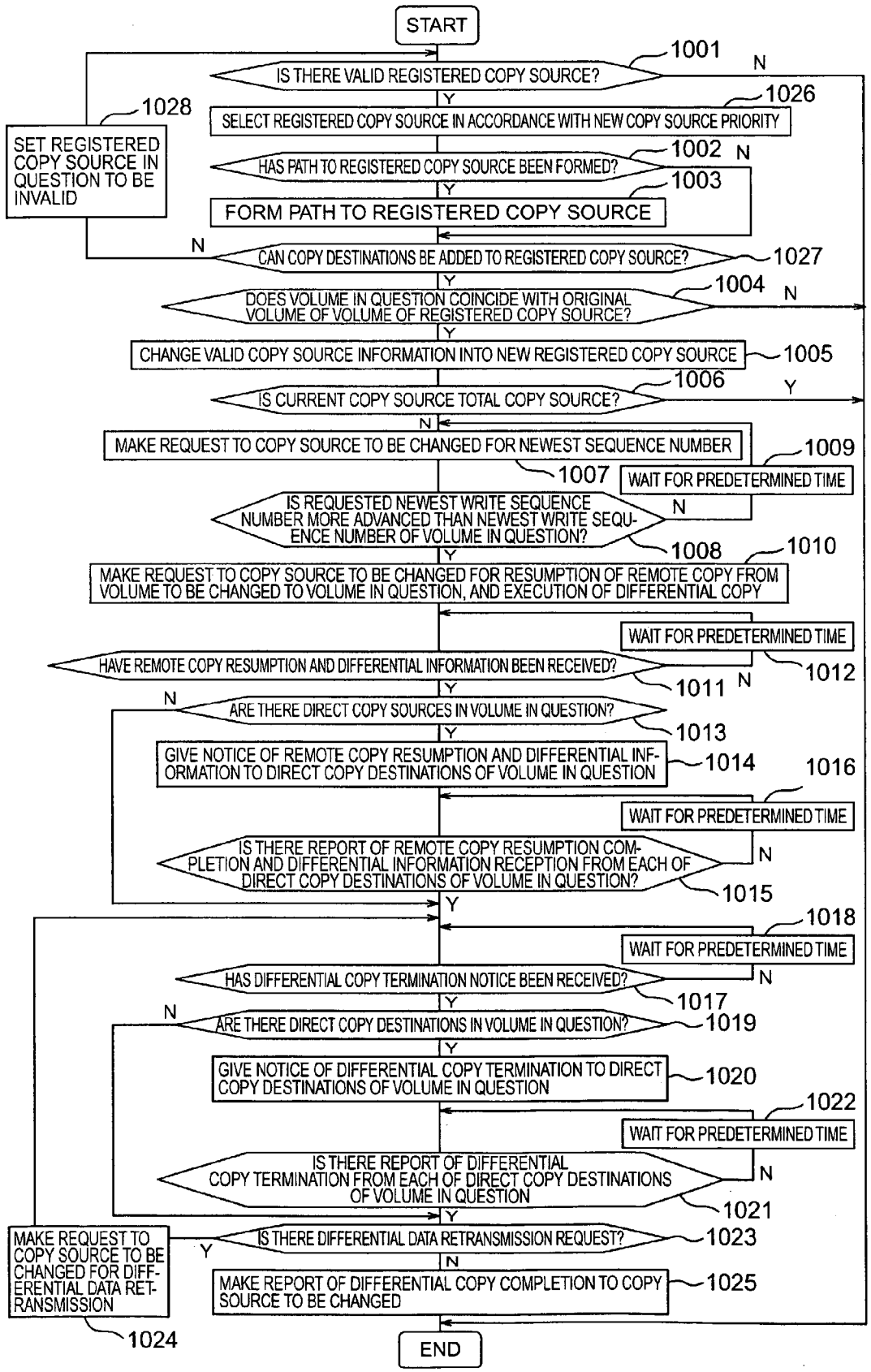
FIG. 11 is a diagram showing an example of remote copy resumption processing executed by a storage system having detected a failure in a copy source.

FIG. 11 is a flow chart for explaining the remote copy resumption processing of the remote copy resumption program 36 started in Step 809 in FIG. 9.

First, the CPU 30 refers to the registered copy source validity flag in each piece of registered copy source information of volumes having a failure in their copy source, and judges whether there are valid registered copy sources or not (Step 1001). When there is no valid registered copy source, the CPU 30 terminates the processing because the copy source cannot be changed to keep up the remote copy.

When there are valid registered copy sources, the CPU 30 refers to the new copy source priority so as to select a copy source having high priority. The new copy source priority is set in advance for each registered copy source by the user. In addition, the number of registered copy sources may be increased or decreased in accordance with the priority of data to be stored in a volume so that remote copy for a high-priority volume having a large number of registered copy sources can be kept up with high probability as soon as there occurs a site failure. In addition, since changing a copy source results in a new load on a new copy source, no copy source may be registered for any volume having low priority, and remote copy may be canceled as soon as there occurs a failure (Step 1026).

Next, the CPU 30 judges whether the path between the selected valid registered copy source and the storage system 2 of its own has been formed or not. Specifically, the CPU 30 refers to volume management information of other volumes sequentially, and concludes that the path has been formed if the storage system number and the port number of one of the copy sources registered in valid copy source information of the volume management information of other volumes coincide with those of the selected valid registered copy source (Step 1002).

When the path has not yet been formed, the CPU 30 makes communication with the storage system 2 indicated by the address information of the registered copy source, and forms the path thereto (Step 1003).

After the path is formed, or when the path has already been formed, the CPU 30 judges whether the volumes having a failure in their copy source can be registered in the registered copy destination of the volume management information corresponding to a volume belonging to a new copy source or not (Step 1027). When the number of registered copy destinations of the volume management information corresponding to the volume belonging to the new copy source has already exceeded a threshold value, the CPU 30 cancels the registration of the volumes belonging to the new copy destinations as copy destinations in order to prevent the new copy source from being overloaded, makes the registered copy source validity flag invalid (Step 1028), and executes the processing of Step 1001 again.

When each volume having a failure in its copy source can be registered as a registered copy destination of the volume belonging to the new copy source, the CPU 30 makes judgement using the total copy source information as to whether the original volume V1 of the volume belonging to the new copy source coincides with the original volume of the volume as a target of remote copy resumption (Step 1004). When the requirement of Step 1004 is not satisfied, the CPU 30 terminates the processing because the CPU 30 cannot change the copy source to keep up the remote copy.

When the requirement of Step 1004 is satisfied, the CPU 30 changes the valid copy source information corresponding to the volume as a target of remote copy resumption into the information about the new copy source. At this time, the copy source is switched to the new copy source (Step 1005).

When the copy source having a failure is a total copy source, there is no registered copy source. Therefore, the CPU 30 terminates the processing. In this case, when remote copy between the total copy source and a copy destination is synchronous remote copy, data in the total copy source coincides with data in the copy destination. Thus, the operation of the total copy source can be turned over directly to the copy destination. On the other hand, when remote copy between the total copy source and the copy destination is asynchronous remote copy, it is inevitable that data which has not yet been transferred from the total copy source to the copy destination will be lost. However, the consistency of data in the copy destination can be secured (the data in the copy destination can be restored into the state of the total copy source at a past time). Thus, the operation can be resumed in the copy destination by use of the data with secured consistency (Step 1006).

Next, the CPU 30 makes a request to the new copy source for a newest sequence number (Step 1007).

The CPU 30 having received the newest sequence number judges whether the received newest sequence number is more advanced than the newest sequence number of the volume as a target of remote copy resumption or not (Step 1008).

When it is not more advanced, the CPU 30 waits for a predetermined time (Step 1009), and executes the processing of Step 1007 again. This is processing for waiting till the updated state of the volume which will be a copy source in differential copy is more advanced than the volume suspended in remote copy in order to execute differential copy.

When it is more advanced, the CPU 30 makes a request to the new copy source for resumption of remote copy between the volume as a target of remote copy resumption and the volume belonging to the new copy source, and execution of differential copy. In response to this request, the differential copy program 35 is executed in the storage system 2 in the new copy source. The differential copy program 35 will be described later (Step 1010).

Next, the CPU 30 judges whether a remote copy resumption notification and differential information have been received from the new copy source or not. The remote copy resumption notification and the differential information to be received by the CPU 30 correspond to a reply transmitted to each copy destination by the storage system in the new copy source executing the differential copy program 35. (Step 1011).

When they have not yet been received, the CPU 30 waits for a predetermined time (Step 1012), and executes the processing of Step 1011 again. When they have been received, the CPU 30 judges whether the volume as a target of remote copy resumption has direct copy destinations or not (Step 1013). When the volume has direct copy destinations, the CPU 30 notifies the direct copy destinations of the remote copy resumption and the differential information. Each storage system 2 notified of the information executes the volume notification transfer program 34 so as to transfer the notification of the remote copy resumption and the differential information to terminal volumes (Step 1014). Incidentally, the transferred differential information is stored in a differential copy bit map by the CPU 30 in each storage system 2.

Next, the CPU 30 judges whether a remote copy resumption completion report and a differential information reception report have been received from each of the direct copy destinations of the volume or not (Step 1015). When the reports have not yet been received, the CPU 30 waits for a predetermined time (Step 1016), and executes the processing of Step 1015 again.

When the reports have been received, the CPU 30 concludes that the remote copy resumption is completed, and carries out the reception of a differential copy termination notification from the new copy source and the transfer of differential copy termination to the copy destinations of the volume to resume remote copy therefor in the procedure similar to Step 1011 to Step 1016. Incidentally, as soon as the CPU 30 of the copy destination in the differential copy receives the differential copy termination notification, the CPU 30 refers to the differential information received before the start of the differential copy and continuously updated during the differential copy, and judges whether all the differential data has been received or not. When there is differential data that has not been received, the CPU 30 inserts the information about the differential data that has not been received, into a differential copy termination report, so as to make a request to the copy source for retransmission of the differential data. Specifically, the CPU 30 judges whether there is a bit that has not yet been cleared or not, in the differential copy bit map. When there is a bit that has not yet been cleared, the CPU 30 inserts the position information of the differential data corresponding to the bit in question into the differential copy termination report (Step 1017 to Step 1022).

Next, the CPU 30 judges whether a differential data retransmission request is included in the differential copy termination report or not (Step 1023). When there is a retransmission request, the CPU 30 makes a request to the new copy source for retransmission of the differential data (Step 1024), and executes the processing on and after Step 1017 again. When there is no retransmission request, the CPU 30 reports the completion of the differential copy to the new copy source (Step 1025), and terminates the processing.

Figure 12:
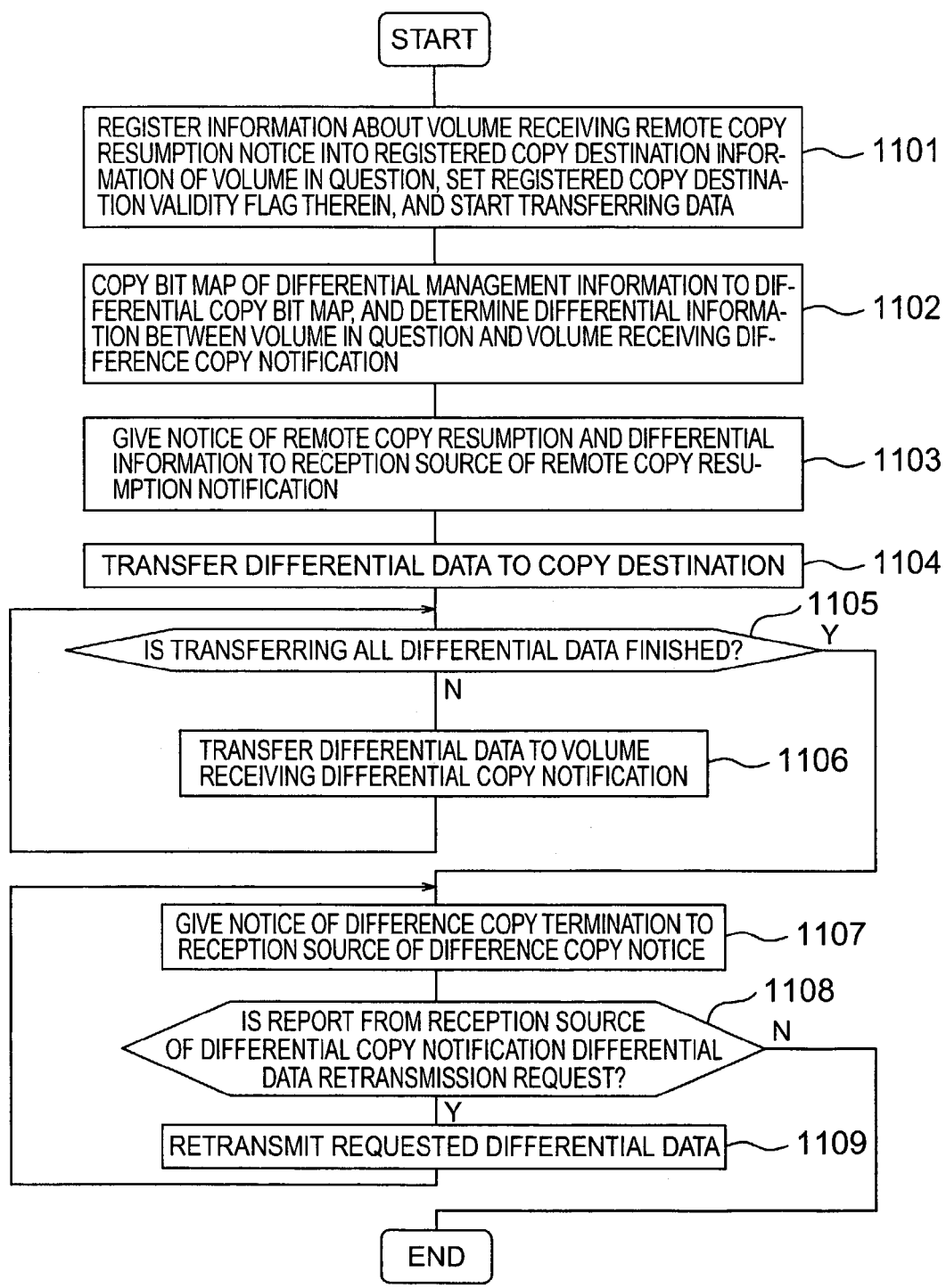
FIG. 12 is a diagram showing an example of a differential copy program executed by a storage system set as a new copy source by a storage system having detected a failure in a copy source.

FIG. 12 is a flow chart for explaining the processing when the differential copy program 35 is executed in the storage system 2 of the new copy source.

First, in response to the request in Step 1010 in FIG. 11, the CPU 30 registers the information about the volume having received the remote copy resumption notification into a registered copy destination information entry of the volume which will be a new copy source, and sets the registered copy destination validity flag (Step 1011).

Next, the CPU 30 determines differential information between the volume which will be a new copy source and the volume having received the differential copy notification (volume of the copy destination). Specifically, the CPU 30 determines the differential information by copying a bit map of differential management information at the time of receiving a notification of the volume which will be a new copy source, to a differential copy bit map area (Step 1102). Incidentally, the method for determining the differential information differs in accordance with how to hold the differential management information.

Next, the CPU 30 gives a notification of the remote copy resumption and the determined differential information to the storage system 2 having transmitted the remote copy resumption notification. This notification is detected in Step 1011 (Step 1103).

Next, the CPU 30 transfers the differential data to the copy destination (Step 1104). After that, the CPU 30 judges whether transferring all the differential data is finished or not (Step 1105).

When transferring is not finished, the CPU 30 transfers the differential data to the volume having received the differential copy notification (copy destination) (Step 1106), and executes the processing of Step 1105 again. When transferring is finished, the CPU 30 gives a notification of the termination of the differential copy to the reception source of the differential copy notification. This notification is detected in Step 917 (Step 1107).

Next, the CPU 30 judges whether the report from the reception source of the differential copy notification is retransmission of the differential data or not (Step 1108).

When the report is a retransmission request, the CPU 30 retransmits the requested differential data (Step 1109), and executes the processing of Step 1107 again. When the report is not a retransmission request, the CPU 30 confirms that the report indicates the differential copy completion, and terminates the processing.

Figure 13:
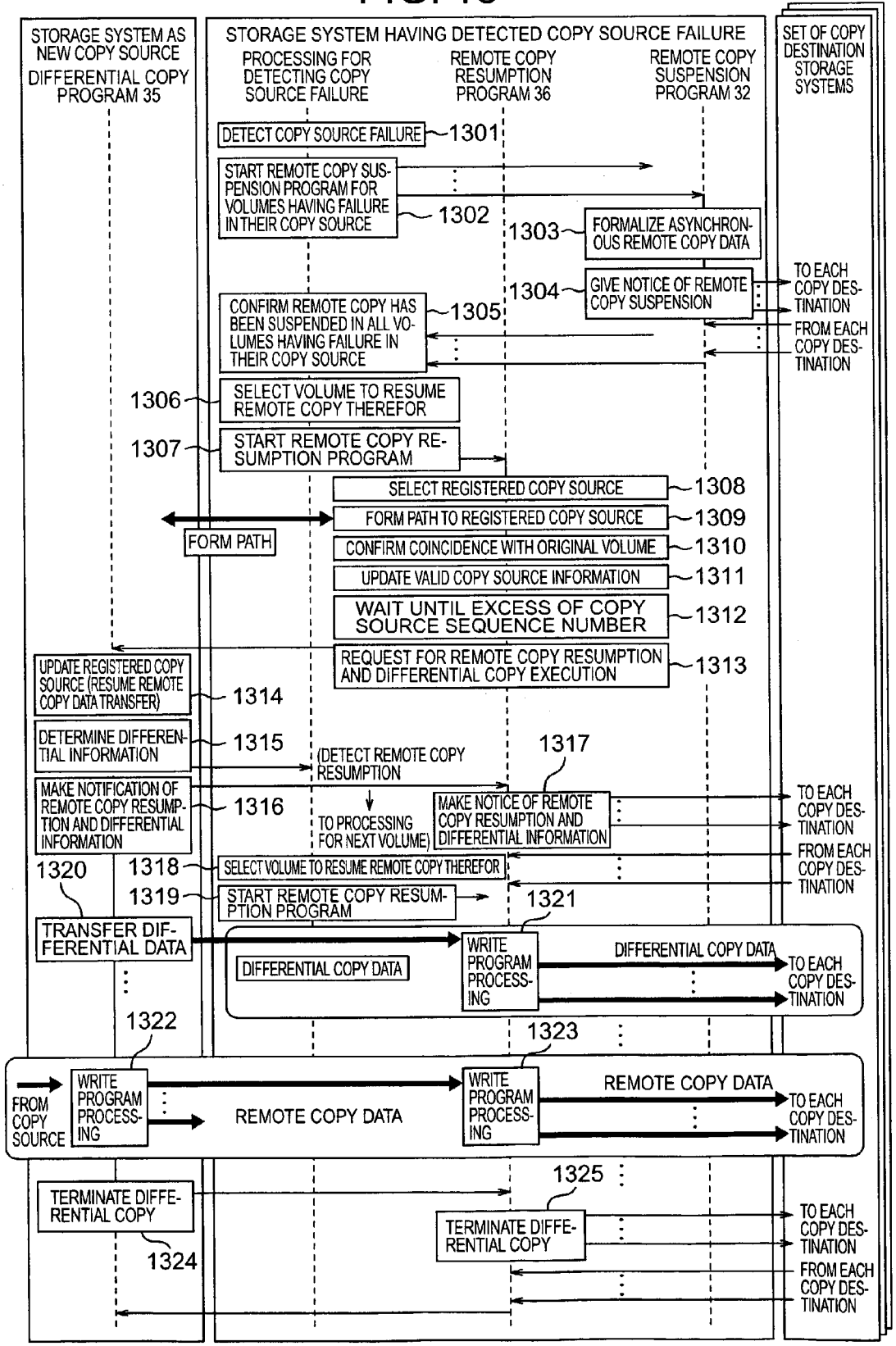
FIG. 13 is a flow chart showing an example of procedure for switching a copy source to a new copy source and resuming remote copy by use of the new copy source.

FIG. 13 is a diagram showing a specific example of the processing procedure in which a failure in a copy source is detected in a storage system 2 having an intermediate volume V2, with the result that a new copy source is selected, and remote copy is resumed. As illustrated, the storage system 2 having detected a failure of the copy source executes the processing for detecting the copy source failure, the remote copy resumption program and the remote copy suspension program in parallel.

The storage system 2 having detected the copy source failure (Step 1301) starts the execution of the remote copy suspension program 32 for each of volumes having a failure in their copy source (Step 1302).

For one of the volumes having a failure in their copy source, the storage system 2 formalizes any formalizable data of asynchronous remote copy (Step 1303), and gives a notification of remote copy suspension to direct copy destinations of the volume (Step 1304).

On the other hand, after remote copy for all the volumes having a failure in their copy source is suspended (Step 1305), the storage system 2 selects a volume having higher priority as a volume to resume remote copy therefor (Step 1306), and starts the execution of the remote copy resumption program 36 for the volume in question (Step 1307).

The storage system 2 executing the remote copy resumption program 36 selects a registered copy source having higher priority as a new copy source (Step 1308), and forms a path thereto if necessary (Step 1309). Further, the storage system 2 confirms the coincidence between the volume belonging to the new copy source with the original volume of the volume in question to resume remote copy therefor (Step 1310) and changes the valid copy source into the new copy source so as to switch the current copy source to the new copy source (Step 1311). Next, the storage system 2 waits till the newest sequence number of the volume belonging to the new copy source is more advanced than the newest sequence number of the volume in question to resume remote copy therefor (Step 1312), and makes a request to the new copy source for the resumption of remote copy and the execution of differential copy (Step 1313).

As soon as the storage system 2 as a new copy source receives the request for the resumption of remote copy and the execution of differential copy in Step 1313, the storage system 2 starts the differential copy program 35.

The storage system 2 as a new copy source registers the volume in question to resume remote copy therefor as a copy destination of the volume belonging to the new copy source (Step 1314), and determines differential information (Step 1315). Further, the storage system 2 as a new copy source gives a notification of the resumption of remote copy and the determined differential information to the storage system 2 as a request source of the resumption of remote copy and the execution of differential copy in Step 1313 (Step 1316).

After that, the storage system having detected the copy source failure executes the remote copy resumption program 36, and gives the notification of the resumption of remote copy and the determined differential information notified in Step 1316, to direct copy destinations of the volume in question to resume remote copy therefor (Step 1317).

On the other hand, the storage system 2 detects the resumption of remote copy notified in Step 1316, selects a volume having higher priority as a volume to resume remote copy therefor (Step 1318), and starts the execution of the remote copy resumption program 36 for the selected volume (Step 1319).

The storage system as a new copy source transfers differential data to the storage system having detected the copy source failure (Step 1320). The storage system 2 having detected the copy source failure and received the differential data executes the write program 31 so as to further transfer the differential data to the direct copy destinations of the volume in question to resume remote copy therefor (Step 1321).

In addition, in parallel with the transfer of the differential data, the storage system as a new copy source executes the write program 31 so as to transfer the received remote copy data to the copy destinations including the storage system 2 having detected the copy source failure (Step 1322). The storage system 2 having detected the copy source failure executes the write program 31 so as to further transfer the remote copy data to the direct copy destinations of the volume in question to resume remote copy therefor, synchronously or asynchronously with the reception of the remote copy data (Step 1323).

Further, as soon as the transfer of the differential data is terminated, the storage system as a new copy source gives a notification of the termination of the differential copy to the request source of the resumption of remote copy and the execution of the differential copy in Step 1313 (Step 1324).

The storage system having detected the copy source failure executes the remote copy resumption program 36 so as to give the notification of the termination of the differential copy notified in Step 1324, to the direct copy destinations of the volume in question to resume remote copy therefor (Step 1325).

On giving the notification of the termination of the differential copy, the storage system 2 having detected the copy source failure terminates the remote copy resumption program 36 and the differential copy program 35 for the volume in question to resume remote copy therefor.

Next, description will be made on the site restoring procedure for making a site restored from its suffered disaster state perform remote copy operation again.

First, each unit included in the site, for example, the storage system 2 is restored to its state before disaster by man power or the like. Specifically, a new facility or a restored facility is secured, and the host 1 and the storage system 2 are installed and connected by man power or the like. In addition, a communication path with other sites is secured.

Next, in each storage system 2 in the restored site, an intermediate volume or a terminal volume out of remote copy target volumes before the suspension of remote copy caused by disaster or the like, is reconstructed by remote copy from a storage system 2 which was a copy source before remote copy was suspended. The procedure has the following outline.

First, in each storage system 2 in the restored site, a transfer path with the storage system 2 which was a copy source previously is established. Next, a volume belonging to the restored storage system 2 is set as a copy destination volume (intermediate volume or terminal volume) again in a volume of the storage system 2 which was a copy source. Then, transferring of the data as a whole included in the volume set as a copy source again, and the updated contents thereof is started. The setting of the copy destination volume may be the same as or quite different from before the suspension of remote copy.

Next, when the volume having contents restored by remote copy has a volume (that is, an intermediate volume) set to have a copy destination volume, the storage system 2 gives a notification of the restoration of the storage system 2 to the storage system 2 set as a copy destination.

The copy destination having received the notification of the restoration of the storage system 2 executes the remote copy suspension program 32 and the remote copy resumption program 36, and switches the copy source to the restored storage system 2.

From above, it is possible to make the site restored from disaster perform the operation of remote copy again.

According to the present invention, remote copy can be resumed chiefly among storage systems disposed in three or more N sites immediately after any site suffers from disaster.

The aforementioned description was made on an embodiment, but the present invention is not limited thereto. It is apparent to those skilled in the art that various changes and modifications can be made on the present invention without departing the claimed scope and the spirit of the present invention.

What is claimed is:

1. A storage system connected among a plurality of storage systems, comprising:

a storage control unit; and a storage unit connected to said storage control unit;

wherein said storage control unit includes a management information memory for storing management information for managing data, said management information including a target flag; wherein said target flag indicating that a target volume is either a copy source or a copy destination;

wherein said management information memory has first and second source information about said plurality of storage systems;

wherein said storage control unit receives data sent from a first storage system in response to said target flag being set when said first source information includes information of said first storage system, and performs processing for directly receiving, by changing said second source information from said first to second storage system, data from said second storage system in response to said target flag being set when said first source information includes information of said second storage system and when data cannot be received from said first storage system for a predetermined period of time; and wherein when said storage control unit receives information of restoration of said first storage system, said storage control unit changes said second source information from said second to said first storage system to receive data from said first storage system.

2. A storage system according to claim 1, wherein said management information memory has information indicating priority of each storage system; and wherein, when said storage control unit receives said information of restoration, said storage control unit selects said storage system in accordance with said priority.

3. A storage system according to claim 1, wherein said management information memory has information indicating priority of data; and wherein said storage control unit judges whether data should be transferred in accordance with said priority of said data.

4. A storage system according to claim 1, wherein said control unit performs processing for receiving data from said first storage system when data can be received from said first storage system.

5. A storage system according to claim 1, wherein said storage control unit performs processing for receiving data from said second storage system in response to a notification indicating said information of restoration received from said first storage system.

6. A storage system according to claim 1 wherein said management information memory has information of destination, and wherein said storage control unit gives a notification of suspension of data reception from said first storage system to a storage system which is a destination of data transfer in accordance with said information of destination.

* * * * *